US010533722B2

(12) United States Patent
Albou et al.

(10) Patent No.: US 10,533,722 B2

(45) Date of Patent: Jan. 14, 2020

(54) LIGHT DEVICE, IN PARTICULAR A LIGHTING AND/OR SIGNALING DEVICE, FOR A MOTOR VEHICLE

(71) Applicant: VALEO VISION, Bobigny (FR)

(72) Inventors: Pierre Albou, Bobigny (FR); Vincent Godbillon, Bobigny (FR); Jean-Claude Puente, Bobigny (FR)

(73) Assignee: VALEO VISION, Bobigny (FR)

(*) Notice: Subject to any disclaimer, the term of this patent is extended or adjusted under 35 U.S.C. 154(b) by 0 days.

(21) Appl. No.: 15/919,581

(22) Filed: Mar. 13, 2018

(65) Prior Publication Data

US 2018/0266640 A1 Sep. 20, 2018

(30) Foreign Application Priority Data

Mar. 13, 2017 (FR) ..................................... 17 52041

(51) Int. Cl.

| | |
|---|---|
| ***B60Q 1/00*** | (2006.01) |
| ***F21S 41/147*** | (2018.01) |
| ***F21S 41/33*** | (2018.01) |
| ***F21S 41/275*** | (2018.01) |
| ***F21S 43/145*** | (2018.01) |
| ***F21S 41/155*** | (2018.01) |
| ***F21S 41/255*** | (2018.01) |
| ***F21S 43/31*** | (2018.01) |

(52) U.S. Cl.

CPC ........... *F21S 41/147* (2018.01); *F21S 41/155* (2018.01); *F21S 41/255* (2018.01); *F21S 41/275* (2018.01); *F21S 41/33* (2018.01); *F21S 43/145* (2018.01); *F21S 43/31* (2018.01)

(58) Field of Classification Search

CPC .............................. F21S 41/255; F21S 41/147

See application file for complete search history.

(56) References Cited

U.S. PATENT DOCUMENTS

| | | | | |
|---|---|---|---|---|
| 5,897,196 A * | 4/1999 | Soskind | .................. | F21S 41/28 362/507 |
| 2009/0027909 A1* | 1/2009 | Albou | ..................... | F21V 13/04 362/517 |
| 2017/0059110 A1 | 3/2017 | Reiss et al. | | |

FOREIGN PATENT DOCUMENTS

| | | |
|---|---|---|
| EP | 0 798 506 A2 | 10/1997 |
| EP | 3 127 747 A1 | 2/2017 |
| WO | WO 2017/025445 A1 | 2/2017 |

OTHER PUBLICATIONS

French Preliminary Search Report dated Sep. 1, 2017 in French Application 17 52041 filed on Mar. 13, 2017 (with English Translation of Categories of Cited Documents).

* cited by examiner

*Primary Examiner* — Andrew J Coughlin

(74) *Attorney, Agent, or Firm* — Oblon, McClelland, Maier & Neustadt, L.L.P.

(57) ABSTRACT

A light device including a light source driven to produce the emission of light rays, as well as a deflection element arranged facing the light source to deflect the emitted light rays, and a ray-forming optic for emitting a light beam out of the device. The light source is a semiconductor source, including at least one substrate and a plurality of light-emitting elements of submillimetric dimensions which extend from a first face of the substrate. The deflection element takes the form of an elliptical or pseudo-elliptical reflector, whose inner face forms a reflection face for the emitted light rays which is turned towards the first face of the substrate of the light source. Also, the forming optic is a divergent lens.

16 Claims, 1 Drawing Sheet

LIGHT DEVICE, IN PARTICULAR A LIGHTING AND/OR SIGNALING DEVICE, FOR A MOTOR VEHICLE

The invention deals with the field of lighting and/or signalling, in particular for motor vehicles. It relates more particularly to a light device comprising a light source, a reflector and an optic for forming rays thus emitted and deflected, arranged in relation to one another for the formation of a light beam in accordance with regulation.

In the context of application to a motor vehicle, it is known practice to associate with a light source a divergent lens to form the forming optic. The arrangement of the object focal point of this lens opposite the light source thus makes it possible to obtain compact light devices, thus offering a greater latitude in the design of the lighting and/or signalling devices.

The use of divergent lens is thus associated with light modules in which an element commonly used elsewhere, namely a shield, or folder, that makes it possible to create a beam with cut off whose edge corresponds to the form of an edge of said shield, is dispensed with. When the lens is associated with existing sources of filament, xenon or LED type, the form and the size are influenced by the source, globally square or rectangular, such that only a beam with flat cut off can be obtained.

In order to produce a beam with cut off, the addition of a specific light module is then necessary for the formation of the inclined part of the cut off. This cut off is obtained by alignment of the top edge of the images of the source in the projected beam. This alignment associated with the size of the sources leads to a thick beam with the light concentrated in front of the vehicle which risks dazzling the driver.

The present invention lies within this context of the search for a light device that is particularly compact and that can generate a beam with cut off. It aims to propose a light device of simple design, limiting the number of components inside the device. In this context, the invention proposes a light device, in particular a lighting and/or signalling device for a motor vehicle, comprising a light source driven to produce the emission of light rays, and a collecting optic, arranged facing the light source to deflect the emitted light rays, and a ray-forming optic for emitting a light beam out of the device.

According to the invention, these various components are particular in that:

- the light source is a semiconductor source, comprising at least one substrate and a plurality of light-emitting elements of submillimetric dimensions which extend from a first face of the substrate, the light-emitting elements notably being able to take the form of rods,
- and the forming optic is a divergent lens.

Moreover, a collecting optic should be understood in particular to be a reflector or a lens, the reflector offering the advantage of being able to reduce the axial bulk.

In particular, the collecting optic can consist of a reflector of elliptical or pseudo-elliptical form, whose inner face forms a reflection face for the emitted light rays which is turned towards the first face of the substrate of the light source.

According to different features of the invention, taken alone or in combination, it will be possible to provide for:

- the components of the device that are the source, the collecting optic and the divergent lens forming the forming optic to be arranged relative to a common axis, forming the optical axis of the device, such that the source is arranged at least partly oil, or in the vicinity of, this axis, that the collecting optic exhibits focal points positioned on this axis and that the divergent lens is centred on, or in the vicinity of, this axis;
- the light-emitting elements to extend at right angles, or substantially at right angles, to the optical axis of the device, towards the collecting optic; hereinbelow, substantially at right angles or parallel should be understood to mean an orientation exhibiting a slight offset in relation to the perpendicular or the parallel, for example of the order of 1 to 5°;
- the light-emitting elements to be aligned on the optical axis at an equivalent height of the base for each light-emitting element, and for example substantially at mid-height of these elements;
- the light source to be arranged in the vicinity of a first focal point of the elliptical or pseudo-elliptical reflector, notably at the first focal point;
- the light source to exhibit a variable luminance according to the direction of the optical axis;
- a zone of strong luminance to be arranged on the edge of the light source opposite the forming optic-forming divergent lens; zone of strong luminance should be understood to mean a zone whose luminance is stronger than the luminance of the neighbouring zone;
- the edge exhibiting a zone of strong luminance to be arranged on the first focal point of the collecting optic;
- the variable luminance to be obtained by a density and/or a height of the light-emitting elements;
- the variable luminance to be able to be obtained, alternatively or cumulatively with the above, by a variation of the power supply of the light-emitting elements;
- the forming optic-forming divergent lens to be arranged on the optical axis of the device such that the object focal point of the divergent lens coincides with, or at the very least is in the vicinity of, the second focal point of the collecting optic-forming elliptical or pseudo-elliptical reflector;
- the collecting optic to be adapted to project the image of the part of strong luminance of the source opposite the divergent lens, in the vicinity of the object focal point of this divergent lens, such that the corresponding rays re-emerge parallel to the optical axis by forming the cut off of the beam emitted at the output of the divergent lens;
- the light source to have a main dimension, this source being arranged such that this main dimension extends transversely to the optical axis of the device;
- the light source to have a rectangular form, whose small side is parallel to the optical axis; rectangular light source should be understood to mean that the emission surface defined by the arrangement of the light-emitting elements has a substantially rectangular form with a determined length and a determined width, the width being, in this case, parallel to the optical axis; and the light-emitting elements of the source to be activated or not to form a high beam or a low beam;
- the light source to be able to have a specific form reflecting the form that is required of the cut off of the beam; in this way it is possible to implement a basic embodiment in which a light source with the appropriate form and an elliptical reflector are associated;
- the light source to be centred on the optical axis.

The light device as has just been described can in particular be implemented for the lighting of a motor vehicle by a beam likely to take the form of a beam with cut off, the collecting optic and the divergent lens being configured so as to form the beam, with cut off or not after refraction by the lens of the rays emitted by the source and deflected by the collecting optic. The light device can thus project a lighting and/or signalling beam such as a lowbeam, a fog beam, and/or a front bending light.

In the latter case in particular, the cut off edge of the beam with cut off can be generated by light rays emitted from an edge of the light source with light-emitting elements; and this cut off edge of the beam with cut off can be generated by light rays emitted from an edge of the light source with light-emitting elements which is configured to emit rays of strong luminance. As previously, strong luminance should be understood to mean rays whose luminance is stronger than the luminance of the rays of a neighbouring zone.

The features of the invention mentioned above, and others, will become more clearly apparent on reading the detailed description below of nonlimiting examples, referring to the attached drawings in which.

Figure 3:
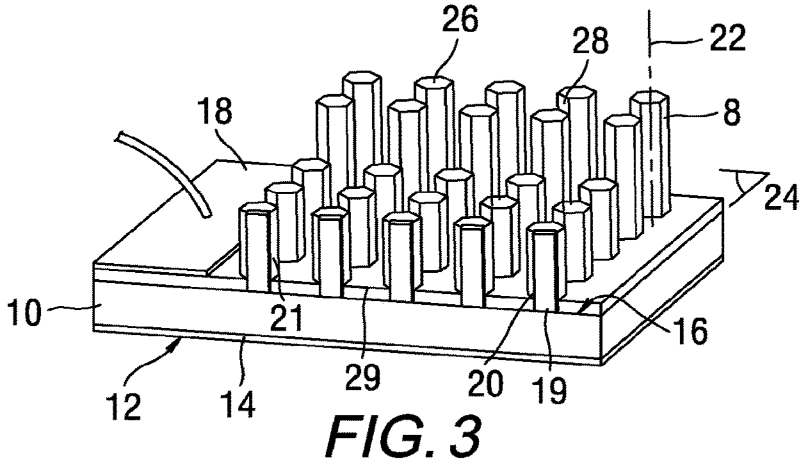

and FIG. 3 is a perspective schematic representation of a portion of the semiconductor light source comprising a plurality of light-emitting elements, in the form of rods, extending protrudingly from a substrate and in which a row of these light-emitting elements, in the form of rods, is made visible in cross section.

Figure 1:
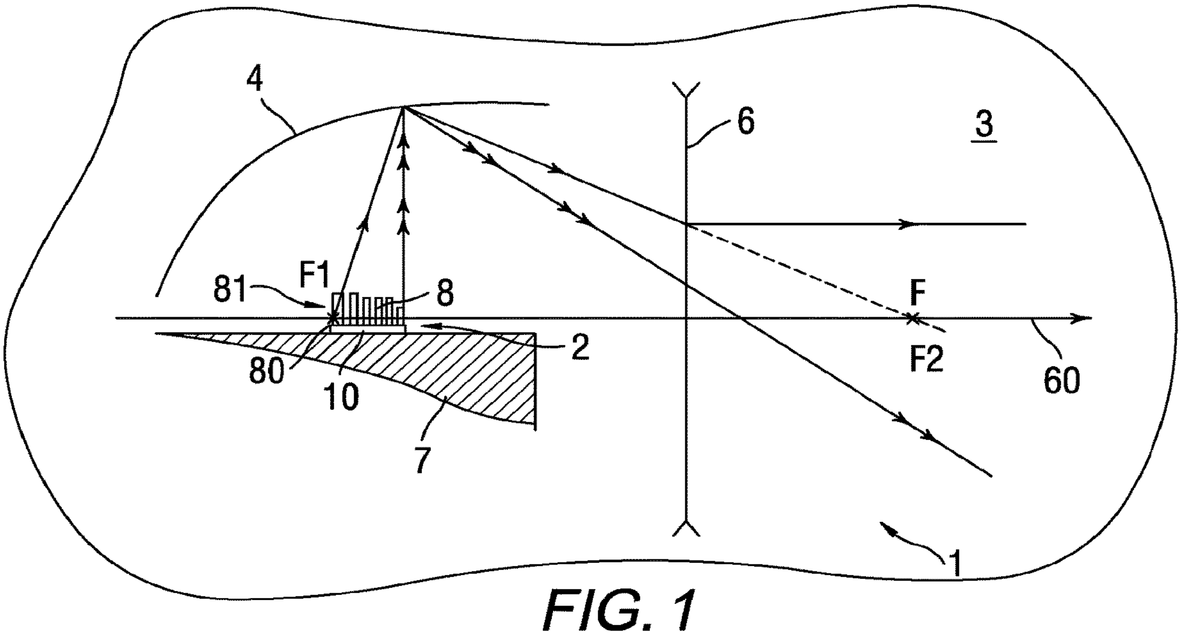
FIG. 1 is a schematic representation of a light module according to an embodiment of the invention, in which a semiconductor light source is secured to a support so as to emit towards a reflector configured to return the rays emitted towards a divergent lens, two lines of rays being represented by way of example to illustrate the principle of the invention.

A light device 1, in particular for the lighting and/or signalling of a motor vehicle, comprises a light source 2, in particular housed in a housing closed by an outer lens and which defines an internal reception volume 3, schematically represented in FIG. 1, for this light source. The light device further comprises a collecting optic 4, forming a deflection element for the light rays emitted by the light source 2 and a forming optic 6. The device is configured such that the forming optic 6 is adapted to image at infinity the light source by deflection of at least a part of the light rays emitted by this light source. The benefit of such a device, particularly for the production of a low beam, that is to say a beam with cut off, will be described hereinbelow.

In FIG. 1, the light source 2 is arranged on a frame 7, forming exchange means for the heat emitted by the light source. The collecting optic 4, here taking the form of an elliptical reflector, is also arranged on the frame 7, covering the light source. The frame 7 also supports electrical power supply means for the source, here not represented, for supplying and activating the light-emitting elements of the light source.

Figure 2:
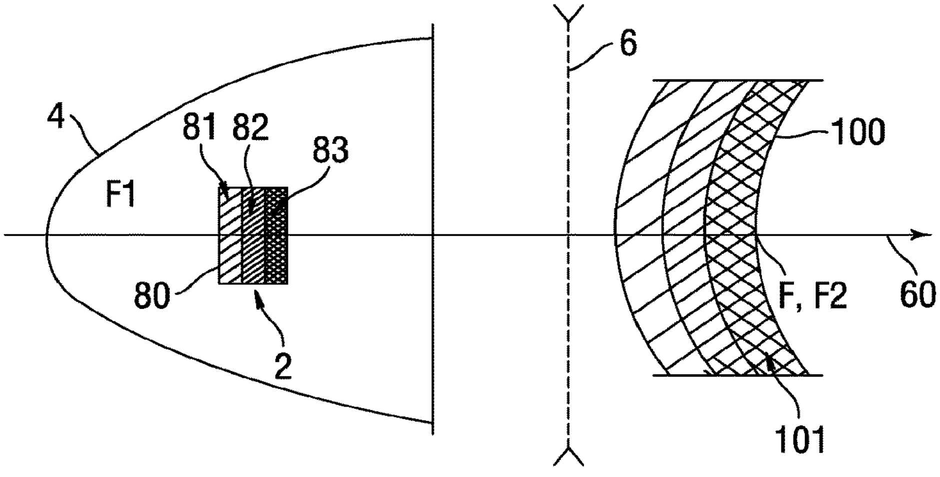
FIG. 2 is a schematic representation of the light module of FIG. 1, seen from above, in which the divergent lens has been removed to illustrate the form that the beam projected in the plane of the source would take in the absence of divergent lens, it being understood that, according to the invention, it is this image which is projected onto the road when the divergent lens is present.

The forming optic 6 is centred on an optical axis 60 of the light device according to the invention, on which the light source is also arranged. In the example illustrated, the light source 2 is centred transversely on the optical axis 60 (as can be seen in FIG. 2) and it is arranged vertically such that the optical axis runs level with the emissive elements that make up this light source. It is understood that, in a variant embodiment, the source can be entirely arranged on one side only of this optical axis.

The light source 2 is oriented such that the rays that it emits are directed mainly towards the ray deflection element 4, a shield here not represented being able to be arranged in the vicinity of the light source to block rays which would go towards the forming optic without first entering into contact with the deflection element. Such a shield would in practice be substantially vertical and arranged in proximity to the source, between the source and the forming optic.

The light source 2 comprises, according to the invention, a plurality of light-emitting elements 8, of submillimetric dimensions, which are arranged protruding from a substrate 10 so as to form, here, rods of hexagonal section. The light-emitting elements extend at right angles to the substrate and at right angles to the optical axis of the device, towards the ray deflection element 4. Provision can in particular be made for, in this context, the optical axis to be situated at mid-height of the mean height of the light-emitting elements with which this light source 2 is equipped.

As a variant, it is also possible to place the source under the axis which would then run in the vicinity of the top emitting surface formed in the vicinity of the free end of the light-emitting elements, if necessary in the vicinity of a top surface of a wavelength conversion material.

These light-emitting elements 8 can be grouped together, in particular by electrical connections specific to each set, in a plurality of zones. In the case illustrated in FIG. 2, it is possible to note an electrical connection of the rods such that three sets of rods are formed including at least a first set 81, a second set 82 and a third set 83 that will be described in more detail hereinbelow.

As specified, the frame 7 acts as a support element of the light source 2 and that of a cooling device associated with the light source, the light source with light-emitting elements here being glued onto this cooling device. As a variant, the light source can be soldered onto a printed circuit board, itself assembled with the frame forming a heat sink, possibly by an adhesive that is a good conductor of heat.

The ray deflection element 4, in the example illustrated, takes the form of an elliptical reflector, or at the very least one that is configured elliptically, that is to say having two optical focal points such that the rays passing through the first focal point before their deflection by the reflector pass through the second focal point after their deflection. It is understood that first focal point F1 should be understood, if necessary, to mean a plurality of first focal points, and in an optimized solution, a row of first focal points corresponding to an edge of the source, and that second focal point F2 should be understood, if necessary, to mean a curved flat line as represented in FIG. 2. The light source 2 is arranged on the first focal point F1 of the reflector, whereas the forming optic 6 is arranged as a function of the position of the second focal point F2 of the reflector as will be described hereinbelow in more detail. It is understood that the inner face of the reflector forms a reflection face for the emitted light rays which is turned towards the first face of the substrate of the light source from which the light-emitting rods are protrudingly arranged.

The forming optic 6 takes the form of a divergent lens, as schematically illustrated in FIG. 1. The divergent lens is arranged on the optical axis 60 of the light device such that its object focal point F is common to the second focal point F2 of the reflector. The benefit of such provisions will be described hereinbelow, in particular by referring to the paths of the light rays illustrated in FIGS. 1 and 2. Generally, the components of the light device that are the source, the reflector and the divergent lens are arranged relative to this optical axis 60 of the light device, such that the light source is arranged at least partly on this axis, that the reflector exhibits focal points positioned on this axis and that the divergent lens is centred on this axis.

Firstly, the structure of a semiconductor light source 2 comprising light-emitting elements of submillimetric dimensions, in the form of rods, will be described, in particular by referring to FIG. 3.

The light source 1 comprises a plurality of light-emitting rods 8 which originate from a first face of a substrate 10. Each light-emitting rod, here formed by the use of gallium nitride (GaN), extends at right angles, or substantially at right angles, protruding from the substrate, here produced based on silicon, other materials like silicon carbide being able to be used without departing from the context of the invention. As an example, the light-emitting rods could be produced from an alloy of aluminium nitride and gallium nitride (AlGaN), or from an alloy of phosphides of aluminium, of indium and of gallium (AlInGaP).

The substrate 10 has a bottom face 12, onto which is added a first electrode 14, and a top face 16, protruding from which extend the light-emitting rods 8, serving as the first face of the substrate described previously, and onto which is added a second electrode 18. Different layers of materials are superposed on the top face 16, in particular after the growth of the light-emitting rods from the substrate, which is here obtained by an ascending approach. Among these various layers, there can be at least one layer of electrically conductive material, in order to allow the electrical power supply of the rods. This layer is etched in such a way as to link particular rods to one another, the switching on of these light-emitting rods then being able to be controlled simultaneously by a control module, not represented here. It will be possible to provide for at least two light-emitting rods, or at least two groups of light-emitting rods, to be arranged to be switched on separately via a system controlling the switching-on.

As specified previously, the intent is to connect the light-emitting rods in sets of rods that are selectively addressable in relation to one another and within which each rod is driven simultaneously, these sets here taking the form of strips, three of them in the example illustrated in FIG. 2.

The light-emitting rods are stretched from the substrate and, as can be seen in FIG. 3, they each comprise a core 19 of gallium nitride, around which are arranged quantum wells 20 formed by a radial superposition of layers of different materials, here gallium nitride and gallium-indium nitride, and a shell 21 surrounding the quantum wells also produced in gallium nitride.

Each light-emitting rod extends according to an axis of elongation 22 defining its height, the base of which rod being arranged in a plane 24 of the top face 16 of the substrate 10.

The light-emitting rods 8 of a same light source advantageously take the same form. They are each delimited by a terminal face 26 and by a circumferential wall 28 which extends along the axis of elongation of the rod. When the light-emitting rods are doped and are the object of a polarization, the resulting light at the output of the semiconductor source is emitted essentially from the circumferential wall 28, it being understood that light rays can also exit from the terminal face 26. The result thereof is that each light-emitting rod acts as a single light-emitting diode, and that the luminance of this source is enhanced on the one hand by the density of the light-emitting rods 8 present and on the other hand by the size of the lighting surface defined by the circumferential wall and which extends therefore over all the perimeter, and all the height, of the rod.

The circumferential wall 28 of a light-emitting rod 8, corresponding to the shell of gallium nitride, is covered by a layer of transparent conductive oxide (TCO) 29 which forms the anode of each rod complementing the cathode formed by the substrate. This circumferential wall 28 extends along the axis of elongation 22 from the substrate 10 to the terminal face 26, the distance from the terminal face 26 to the top face 16 of the substrate, from which the light-emitting rods 8 originate, defining the height of each rod. As an example, provision is made for the height of a light-emitting rod 8 to lie between 1 and 10 micrometres, whereas provision is made for the greatest transverse dimension of the terminal face, at right angles to the axis of elongation 22 of the rod concerned, to be less than 2 micrometres. It will also be possible to provide for defining the surface of a rod, in a sectional plane at right angles to this axis of elongation 22, within a range of determined values, and in particular between 1.96 and 4 micrometres squared.

It is understood that, in the formation of the light-emitting rods 8, the height can be modified from one zone of the light source to the other, so as to increase the luminance of the corresponding zone when the mean height of the rods of which it is composed is increased. Thus, one group of light-emitting rods can have a height, or heights, differing from another group of light-emitting rods, these two groups being constituents of the same semiconductor light source comprising light-emitting rods of submillimetric dimensions.

It can be seen in particular in FIGS. 1 and 3 that the light-emitting rods 8 of two rows have a greater mean height than the mean height of the other rods. How these rods, here two rows, form a first set advantageously arranged in the vicinity of an edge of the light source arranged at the first focal point F1 of the reflector will be described hereinbelow.

The form of the light-emitting rods 8 can also vary from one device to another, in particular on the section of the rods and on the form of the terminal face 26. The rods have a generally cylindrical form, and they can in particular, as illustrated in FIG. 3, have a form of polygonal, and more particularly hexagonal, section. It is understood that it is important for the light to be able to be emitted through the circumferential wall, whether the latter has a polygonal or circular form.

Moreover, the terminal face 26 can have a form that is substantially flat and at right angles to the circumferential wall, such that it extends substantially parallel to the top face 16 of the substrate 10, as is illustrated in FIG. 3, or else it can have a form that is domed or pointed at its centre, so as to multiply the directions of emission of the light exiting from this terminal face.

In a variant not represented, the semiconductor light source 2 can further comprise a layer of a polymer material in which the light-emitting rods are at least partially embedded. The polymer material, which can in particular be based on silicone, creates a protective layer which makes it possible to protect the light-emitting rods without hampering the diffusion of the light rays. Furthermore, it is possible to incorporate, in this layer of polymer material, wavelength conversion means, and for example luminophores, capable of absorbing at least a part of the rays emitted by one of the rods and of converting at least a part of said absorbed excitation light into an emission light having a wavelength different from that of the excitation light. It will be equally possible to provide for the wavelength conversion means to be embedded in the mass of the polymer material, or else for them to be arranged on the surface of the layer of this polymer material.

The light source can further comprise a coating of material reflecting the light which coating is arranged between the light-emitting rods 8 to deflect the rays, initially oriented towards the substrate, towards the terminal face 26 of the light-emitting rods 8. In other words, the top face 16 of the substrate 10 can comprise a reflecting means which returns the light rays, initially oriented towards the top face 16, towards the output face of the light source. Rays which otherwise would be lost are thus recovered. This coating is arranged between the light-emitting rods 8 on the layer of transparent conductive oxide 29.

The light-emitting rods 8 are arranged in a two-dimensional matrix. This arrangement could be such that the rods are arranged staggered. Generally, the rods are arranged at regular intervals on the substrate 10 and the distance separating two immediately adjacent light-emitting rods, in each of the dimensions of the matrix, must be at least equal to 2 micrometres, in order for the light emitted by the circumferential wall 28 of each rod 8 to be able to exit from the matrix of light-emitting rods. Moreover, provision is made for these separation distances, measured between two axes of elongation 22 of adjacent rods, not to be greater than 100 micrometres.

The light-emitting rods of submillimetric dimensions define, in a plane, substantially parallel to the substrate, a determined emission surface, which has a substantially rectangular form with a determined length and width. As illustrated in FIG. 2, the terms length and width are employed to define the main dimensions of the emission surface formed by the rods in the plane parallel to the substrate. Also, it is notable in this FIG. 2 that the light source is arranged for, on the one hand, the width, or small side, of the rectangular emission surface to be parallel to the optical axis and, on the other hand, a length, or large side, to be centred on this optical axis, it being understood that it would be possible to have an eccentric arrangement. In other words, in the transverse direction at right angles to the optical axis in the plane of the substrate, the light source, or at the very least the emission surface defined by the light-emitting elements, is arranged symmetrically on the optical axis. The arrangement of the light source longitudinally, that is to say along the optical axis, will be described hereinbelow. It is understood from the above, and as is illustrated in FIG. 2, that the main dimension of the light source, or at the very least the emission surface defined by the light-emitting elements, extends transversely, that is to say at right angles, to the optical axis.

As has previously been described, in the example illustrated according to the invention, the light source 2 has light-emitting rods arranged in three selectively activatable sets which each take the form of a strip, these strips being stacked along the optical axis 60. These strips respectively forming the first set 81, the second set 82 and the third set 83 are separated from their immediate neighbour by a demarcation line, as is notably visible in FIG. 2. This demarcation line between two successive sets here follows the form of a portion of straight line, and it will be understood that it could be obtained equally by the physical production of a curb extending protruding from the substrate, or produced solely by the distinct electrical connection of the sets of rods.

In each of the cases, it is understood that the rods, associated respectively with one or other of the two sets on either side of the demarcation line, are connected electrically for the sets to be selectively activatable.

The first set 81 has rods whose mean height is greater than the mean height of the rods of the second set 82 and greater than that of the rods of the third set 83. As specified previously, the light source 1 is arranged such that it is the first set 81 which is arranged on the first focal point of the ray deflection element 4. The sets of rods arranged further away from this first focal point have a mean rod height substantially equal to one another, but less than that of the first set 81, which thus generates a greater luminance than the other sets of rods. The result thereof is a light source which exhibits a variable luminance along the direction of the optical axis.

In this context, provision can be made to configure each of the light-emitting elements such that the first set 81 of rods exhibits a luminance 3 to 4 times greater than the mean luminance of the other sets of rods.

It is understood from the above that driving elements associated with the light source 2 are configured to drive the activation of the first set 81 separately from that of the second set 82 and/or the third set 83.

There now follows a more detailed description of the positions relative to one another of the light source 2, of the elliptical reflector forming the optical deflection element 4 and of the divergent lens forming the forming optic 6, and the impact that that has on the path of the rays.

The elliptical reflector has a first focal point on which is positioned the light source, and more particularly the longitudinal end edge corresponding to the first set of rods, and a second focal point coinciding with the object focal point of the divergent lens. This matching point of the second focal point of the reflector and of the focal point of the divergent lens is situated on the other side of the divergent lens in relation to the light source and the reflector. In other words, the divergent lens is positioned between the first and the second focal points of the reflector.

First rays (represented in FIG. 1 by lines with a single arrow) are emitted from the first set 81 of rods 8, that is to say from the zone of the light source situated substantially on the first focal point of the reflector. The result thereof is a deflection of the emitted rays towards the second focal point of the reflector, the latter being elliptical or at the very least configured so as to observe this principle of elliptical reflection with dual focal point. These rays, before reaching the second focal point of the reflector, arrive on the divergent lens. The incidence of these rays being such that they theoretically pass through the object focal point of the lens, since it coincides with the second focal point of the reflector, the rays are then projected at the output of the divergent lens parallel, or substantially parallel, to the optical axis 60.

Second rays (represented in FIG. 1 by lines with double arrow) are emitted from the second or third set of rods 8, corresponding to a zone of the light source situated downstream of the first focal point of the reflector, that is to say situated between the first focal point and the second focal point of the reflector. This results in deflected rays which would be brought to intersect the optical axis upstream of the second focal point of the reflector, in the absence of lens, as illustrated also in FIG. 2. These rays, before reaching this theoretical focal point, arrive on the divergent lens. The incidence of these rays being such that they theoretically pass upstream of the object focal point of the lens, since it coincides with the second focal point of the reflector, the rays are then projected at the output of the divergent lens with an inclination in relation to the optical axis 60, under the horizon defined by this optical axis 60.

In other words, the reflector is adapted to project the image of the very bright part of the source opposite the divergent lens, in the vicinity of the object focal point of this divergent lens, such that the corresponding rays emerge parallel to the optical axis by forming the cut off of the beam emitted at the output of the divergent lens.

It is thus possible to produce a beam of low beam type, with a quite sharp beam cut off delimited by the edge of the light source arranged on the first focal point of the elliptical reflector.

It is consequently worth noting the benefit of having a first set 81 of rods, arranged in contact with this edge of the light source corresponding to the cut off edge, which is configured to have a higher luminance than the other sets of rods. A zone of strong light intensity is thus produced in the beam projected, just under the cut off edge.

In the example illustrated, the stronger luminance is obtained by a greater mean height of the rods 8 of this first set 81, but it will be understood that this strong luminance could be obtained differently, by a greater density of rods for example. In each of these cases, a zone of strong luminance is arranged on the rear longitudinal end edge 80 of the light source 2, that is to say the edge of the light source opposite the divergent lens. As was able to be specified previously, this edge exhibiting a zone of strong luminance is arranged on the first focal point of the elliptical or pseudo-elliptical reflector. This is made visible in particular in FIG. 2, in which are schematically illustrated the zones of theoretical projection of the rays corresponding to each of the three sets of rods, that is to say the zones of projection in the absence of the divergent lens, illustrated to this purpose in FIG. 2 by dotted lines. The rear longitudinal end edge 80 of the light source with rods 8, positioned on the first focal point F1 of the reflector 4, is imaged by a cut off edge 100 of the projected beam. It is found that the beam projected by imaging of a rectangular light source via the elliptical reflector 4 exhibits an incurved form in the vicinity of the second focal point of the reflector, in the absence of the divergent lens. The first set 81 of rods, of strong luminance and arranged in the direct vicinity of the rear longitudinal end edge 80, generates a first part 101 of the projected beam, more intense, and, in succession, each set of rods, whose luminance decreases with distance away from the first set 81 of rods, generates a part of beam of increasingly lesser intensity, and intersecting the optical axis upstream of the theoretical second focal point F2, such that they are made to be projected under the horizon, increasingly closer to the vehicle, when they are corrected by the forming optic 6 and in particular the divergent lens.

In a basic mode of operation, driving elements associated with the light source control the selective activation of the light-emitting rods present in each of the sets of rods. The driving of these sets can be selective in that the power supply intensity of each of the sets of rods varies according to their distance from the longitudinal end edge 80 of the light source 2. A beam of low beam type is produced here, with a cut off edge, it being understood that other types of beam could be produced, in particular by modifying the position of the light source in relation to the first focal point of the reflector. It is understood that, to modify the luminance from one zone to another, it will be possible to act on the distinct power supply of the zones and equally on the height and/or the density of the light-emitting elements protruding from the substrate, and that it will be possible to implement one and/or other of these embodiments described previously.

The present invention applies quite particularly to a front headlight of a motor vehicle, and it is incorporated in particular in a vehicle front face.

The described embodiments apply to light sources with electroluminescent rods protruding and extending from the same substrate as described above but also to light sources with electroluminescent blocks obtained by cutting superimposed electroluminescent layers on the same substrate, the blocks replacing the rods.

Obviously, various modifications can be made by the person skilled in the art to the structure of the light device which has just been described by way of nonlimiting example, provided that it uses at least one semiconductor light source with light-emitting elements, a collecting optic, and, for example, an elliptical or pseudo-elliptical reflector, and a divergent lens. In any case, the invention cannot be limited to the embodiment specifically described in this document, and extends in particular to any equivalent means and to any technically operable combination of these means.

The invention claimed is:

1. A light device, in particular a lighting and/or signalling device for a motor vehicle, comprising:

a light source driven to produce the emission of light rays;

a collecting optic arranged facing the light source to deflect the emitted light rays; and a ray-forming optic for emitting a light beam out of the device, wherein the light source is a semiconductor source, comprising at least one substrate and a plurality of light-emitting elements of submillimetric dimensions which extend from a first face of the substrate, wherein the ray-forming optic is a divergent lens, wherein the light source, the collecting optic and the divergent lens are arranged relative to a common axis, forming an optical axis of the device, wherein the light source is arranged at least partly on the axis, the collecting optic exhibits a first focal point and a second focal point both positioned on the axis, and the divergent lens is centred on the axis, wherein the plurality of light-emitting elements are arranged into at least a first and a second set of light-emitting elements, a mean height of the light-emitting elements of the first set is greater than a mean height of the light-emitting elements of the second set, and wherein the light-emitting elements of the first set are arranged on the first focal point.

2. The light device according to claim 1, wherein the collecting optic is a reflector of elliptical or pseudo-elliptical form, whose inner face forms a reflection face for the emitted light rays which is turned towards the first face of the substrate of the light source.

3. The light device according to claim 2, wherein the forming optic-forming divergent lens is arranged on the optical axis of the device wherein the object focal point of the divergent lens coincides with, or is in the vicinity of, the second focal point of the collecting optic-forming elliptical or pseudo-elliptical reflector.

4. The light device according to claim 2, wherein the light source is centred on the optical axis of the device.

5. The light device according to claim 2, wherein the components of the device that are the source, the collecting optic and the divergent lens forming the forming optic are arranged relative to a common axis, forming the optical axis of the device, wherein the source is arranged at least partly on, or in the vicinity of, this axis, that the collecting optic exhibits focal points positioned on this axis and that the divergent lens is centred on, or in the vicinity of, this axis.

6. The light device according to claim 2, wherein the light source is arranged at the first focal point of the collecting optic-forming elliptical or pseudo-elliptical reflector.

7. The light device according to claim 2, wherein the forming optic-forming divergent lens is arranged on the optical axis of the device wherein the object focal point of the divergent lens coincides with, or is in the vicinity of, the second focal point of the collecting optic-forming elliptical or pseudo-elliptical reflector.

8. The light device according to claim 1, wherein the light-emitting elements extend at right angles, or substantially at right angles, to the optical axis of the device, towards the collecting optic.

9. The light device according to claim 1, wherein the light source exhibits a variable luminance according to the direction of the optical axis.

10. The light device according to claim 9, wherein a zone of strong luminance is arranged on an edge of the light source opposite the forming optic-forming divergent lens.

11. The light device according to claim 10, wherein the edge exhibiting a zone of strong luminance comprises the first set of light-emitting elements.

12. The light device according to claim 9, wherein the variable luminance of the light source is obtained by a density of the light-emitting elements.

13. The light device according to claim 1, wherein the light source has a main dimension, this source being arranged such that wherein this main dimension extends transversely to the optical axis of the device.

14. The light device according to claim 1, for the lighting of a motor vehicle by a beam with cut off, the collecting optic and the divergent lens being configured so as to form the beam with cut off after refraction by the lens of the rays emitted by the source and deflected by the collecting optic.

15. The light device according to claim 14, wherein the cut off edge of the beam with cut off is generated by light rays emitted from an edge of the light source with light-emitting elements.

16. The light device according to claim 15, wherein the cut off edge of the beam with cut off is generated by light rays emitted from an edge of the light source with light-emitting elements which is configured to emit rays of strong luminance.

* * * * *